INVENTOR
Raymond W. Hergott

United States Patent Office 3,424,236
Patented Jan. 28, 1969

3,424,236
CONDENSER UNIT FOR AUTOMOTIVE VEHICLES
Raymond W. Hergott, Dallas, Tex., assignor to Tempking Corporation, Dallas, Tex., a corporation of Texas
Filed Jan. 5, 1967, Ser. No. 607,538
U.S. Cl. 165—122     1 Claim
Int. Cl. F28f *13/12;* F25b *39/04;* B60h *3/04*

ABSTRACT OF THE DISCLOSURE

A cooling unit for installation on the top of an automotive vehicle, and transversely thereof, comprising a streamlined open ended housing having a planar bottom and continuously curved front, top and rear walls which consist substantially in their entirety of a pair of corresponding curved radiator elements, arranged end to end and open to the flow of air therethrough, the said radiator elements comprising a continuous convoluted tube whose convolutions are parallel and spaced apart, having heat radiating fins therebetween.

---

This invention relates to a condenser unit, and it has particular reference to such a unit forming a portion of an air conditioning system for use in an automotive vehicle.

A prime object of the invention is that of providing an improved condenser unit for application to the top of an automotive vehicle, exteriorly thereof, for cooling and condensing, by indirect heat exchange with atmospheric air, a compressed, normally gaseous refrigerant, at one stage in the recycling of said refrigerant, in a conventional refrigeration system of a type which is commonly used for air conditioning such vehicles.

A further object of the invention resides in the provision of a condenser unit as described which is characterized by its stream-lined contour, whereby it conforms generally to the contour of the vehicle on which it is mounted, and does not tend to pull away from the vehicle or to resist substantially the flow of air across the top thereof, in response to movement of the vehicle, while at the same time effecting efficient heat transfer whereby the refrigerant is cooled and condensed.

Broadly, the invention contemplates the provision of a condenser unit as described in which portions thereof which are exposed to the flow of air across the top of the vehicle, in response to movement of the vehicle, are continuously curved and stream-lined, and consist substantially in their entirety of radiator elements which are open to the flow of air therethrough.

While the foregoing objects are paramount, other and lesser objects will become apparent as the description proceeds, when considered in connection with the appended drawings wherein.

Figure 7:
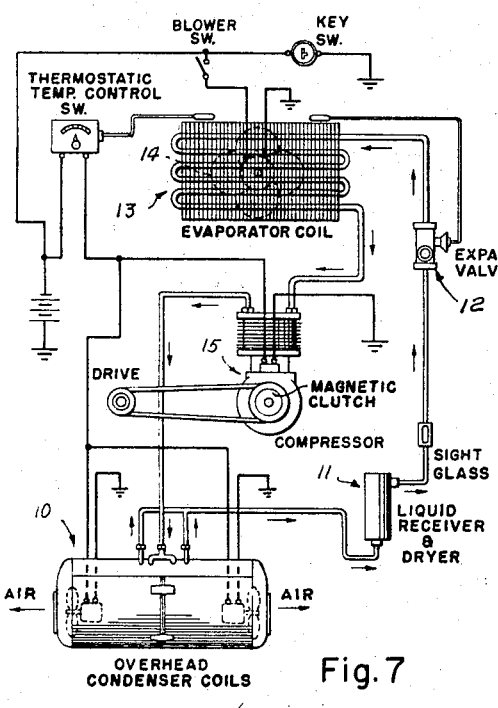
FIGURE 7 is a diagrammatic view showing a conventional refrigeration system, as employed in the air conditioning of automobiles, having the condenser unit of the invention incorporated therein.

Referring to the diagrammatic illustration of FIGURE 7 of the drawing, the numeral 10 designates generally a condenser unit embodying the invention, which as shown is operatively connected in a conventional refrigeration system, as employed in the air conditioning of automobiles.

The refrigeration system shown in FIGURE 7 further includes, in association with the condenser unit 10, a liquid receiver 11, to and from which a compressed, cooled and condensed, normally gaseous refrigerant is recycled, an expansion valve 12, an evaporator coil 13 through which the refrigerant is passed at reduced pressure, a fan 14 arranged to blow air over the outside of the coil 13, to cool the air, and a compressor 15 acting on the vaporized refrigerant to compress it. The condenser unit 10 cools and condenses the compressed refrigerant, by indirect heat exchange with atmospheric air, before returning the refrigerant, in liquid form, to the receiver 11.

Figure 1:
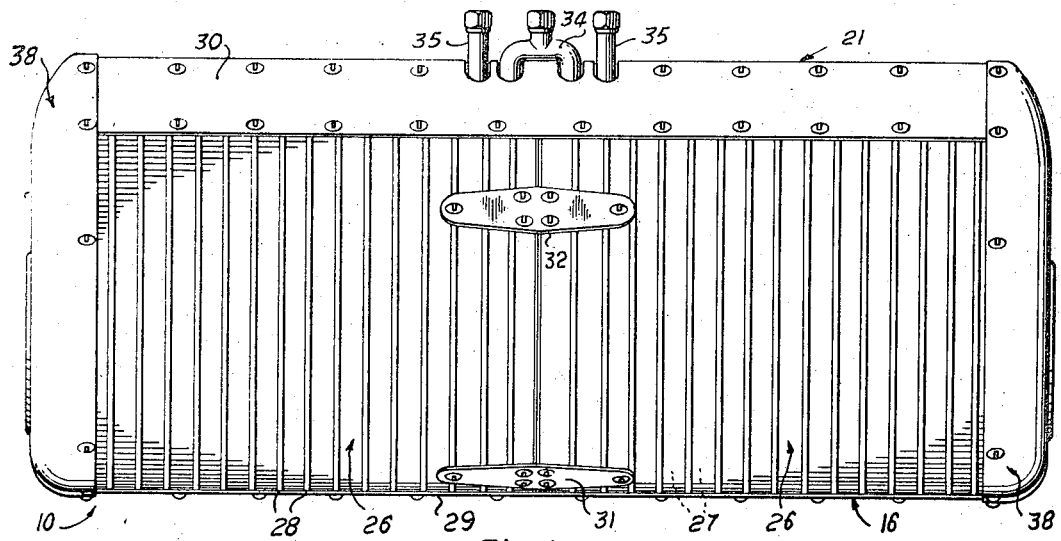
FIGURE 1 is a top plan view of a condenser unit embodying the invention.
Figure 2:
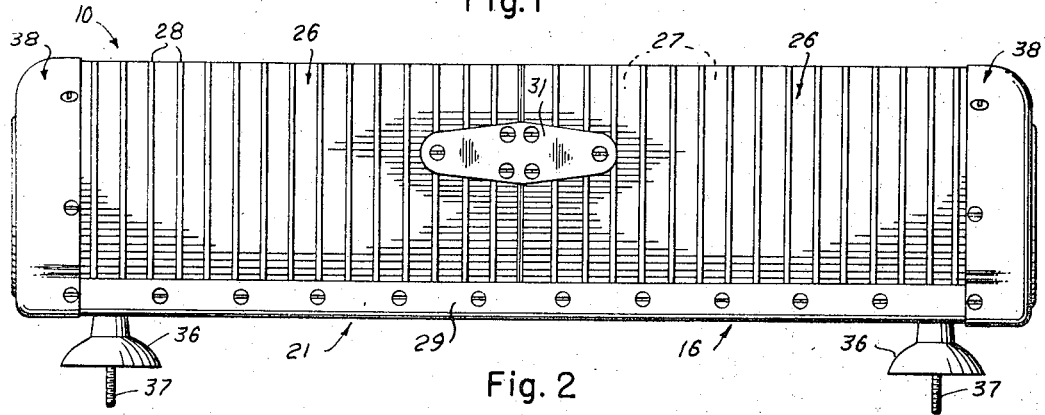
FIGURE 2 is a front elevational view thereof.
Figure 3:
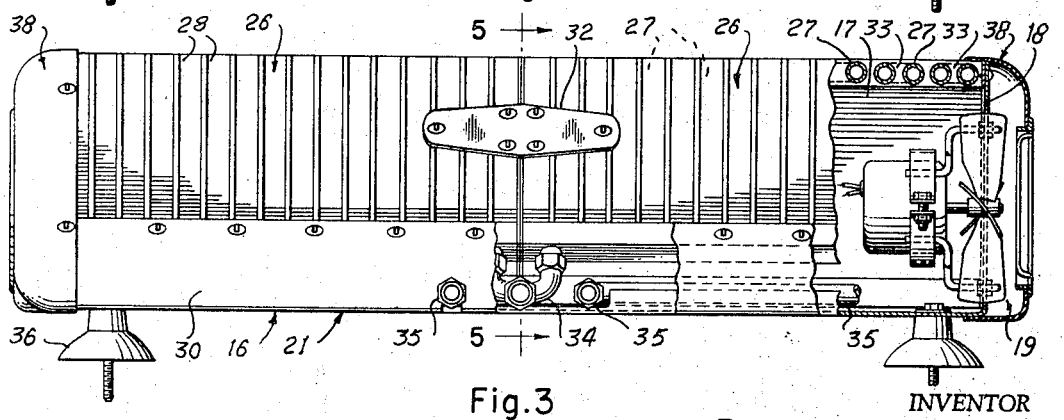
FIGURE 3 is a rear elevational view.

Referring now to FIGURES 1 to 6, the condenser unit 10 comprises an elongated louvered housing 16 defining a chamber 17 therein, as shown fragmentarily in FIGURE 3, having an opening 18 at each end and an exhaust fan 19 operatively positioned in each opening. In use the condenser unit 10 is applied to the top and exteriorly of an automotive vehicle 20, shown fragmentarily in FIGURE 5, and in its operative position is arranged transversely of the vehicle 20 and forwardly thereof.

Figure 6:
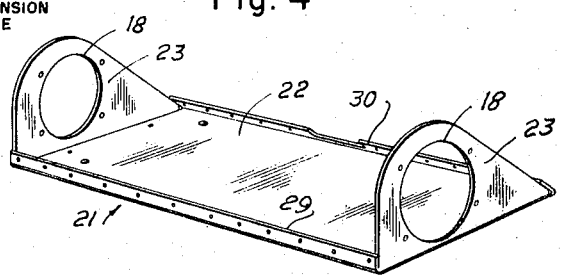
FIGURE 6 is a perspective view showing the sheet metal base which forms the bottom and two opposite ends of the condenser unit.

The housing 16 is formed in part by a sheet metal base 21, shown in FIGURE 6, which has a planar bottom portion 22 and vertical end portions 23 in which the end openings 18 are formed therein. The exhaust fans 19 are mounted on the end portions 23 by means including a plurality of brackets 24 which are spaced circumferentially relative to the respective fans 19 and have one of their ends clamped to the corresponding fan motor, as at 25.

The front, top and rear walls of the housing 16, which are continuously curved, consist substantially in their entirety of a pair of correspondingly curved radiator elements 26, arranged end to end, which are open to the flow of air therethrough. The elements of which the housing 16 is formed are stream-lined, reaching their maximum height near the front, and are curved upwardly and rearwardly from the front, and then downwardly and rearwardly, and terminate in downwardly and rearwardly inclined portions.

Each of the elements 26 comprises a continuous convoluted tube 27 and whose convolutions are arranged parallel and spaced apart, as shown in FIGURE 3, and conform to the transverse contour of the louvered housing 16. The separate tubes 27 are connected in series at their adjoining ends. Each of the parllel convolutions of the tubes 27 is separated by a radiation fin 28 which are curved to conform to the contour of the housing 16.

Figure 5:
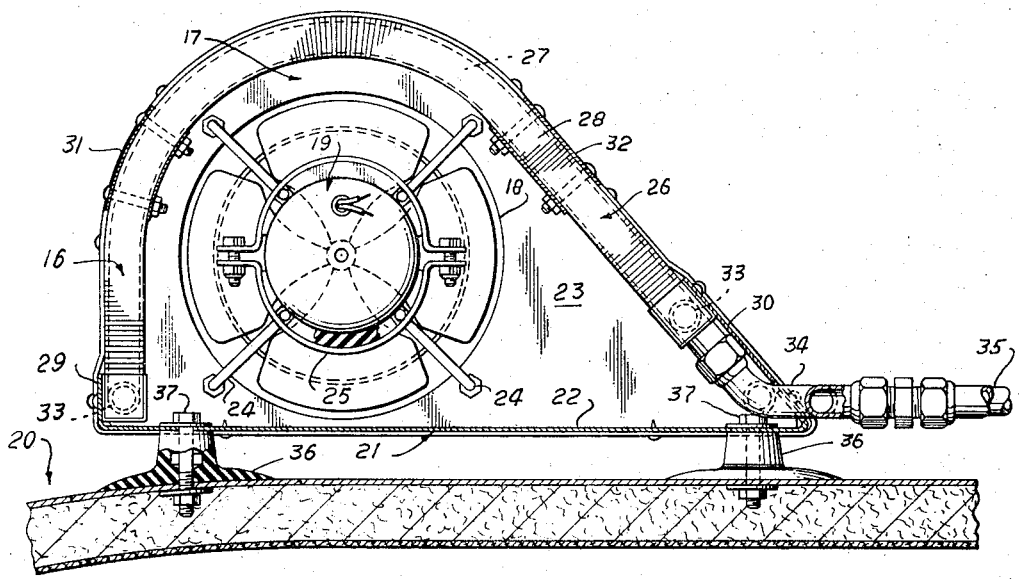
FIGURE 5 is a sectional elevational view on an enlarged scale, taken on the line 5—5 of FIGURE 3, showing the condenser unit in its operative position in which it is mounted on the top of an automotive vehicle, shown fragmentarily.
Figure 4:
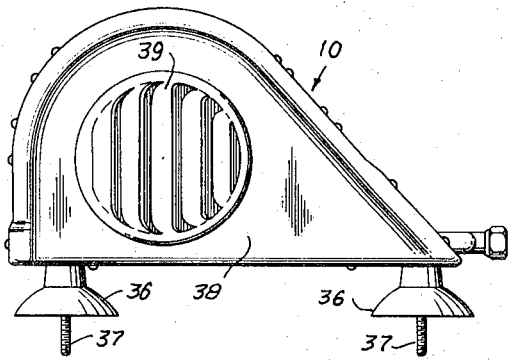
FIGURE 4 is an elevational view showing one end of the condenser unit.

As shown in FIGURE 6, the sheet metal base 21 has upwardly extending marginal portions 29 and 30 forwardly and rearwardly thereof whereby it is connected to the radiator elements 26, the latter being rigidly joined by plates 31 and 32 on opposite sides thereof. In FIGURES 3 and 5, the numerals 33 indicate two of the U bends or convolutions of the tubes 27 at each side of the assembly. The inlet and outlet connections for the tubes 27 are indicated by the numerals 34 and 35.

The condenser unit 10 is connected to the top of the vehicle 20, as illustrated in FIGURE 5, by resilient suction cups 36 and bolts 37 which are secured to the sheet metal base 21 at each corner thereof. The ends of the housing 16, which is shown in two sections, are closed by ornamental caps 38 having louvered openings 39 therein, as shown best in FIGURE 4.

The invention may be modified within certain limitations by persons skilled in the art without departing from the spirit and intent thereof or the scope of the appended claim.

What is claimed is:

1. In a condenser-type cooling unit for automotive vehicles for cooling and condensing a compressed refrigerant by indirect heat exchange with atmospheric air in a conventional refrigeration system for air conditioning such vehicles, the combination of an elongated housing defining an open ended chamber having an exhaust fan operatively positioned in each open end thereof, said housing in its operative position being arranged transversely and forwardly of a vehicle, and having a planar bottom and continuously curved front, top, and rear walls, defining an airfoil shape, and consisting substantially in their entirety of a pair of correspondingly curved radiator elements, arranged end to end, and open to the flow of air therethrough, each of said radiator elements comprising a continuous convoluted tube whose convolutions are parallel and spaced apart, and having a curvature intermediate their return bends corresponding to the curvature of said front, top, and rear walls, arranged transversely of said housing, and connected in series end to end for the flow of a refrigerant therethrough in indirect heat exchange relation to the flow of atmospheric air therearound, and a heat radiating fin arranged between each of the convolutions of said tube.

References Cited

UNITED STATES PATENTS

| | | | |
|---|---|---|---|
| 1,729,420 | 9/1929 | Eisenhauer | 62—507 |
| 1,759,962 | 5/1930 | Stock | 62—507 |
| 2,115,785 | 5/1938 | Peo | 62—244 XR |
| 2,134,724 | 11/1938 | McClanahan | 62—243 XR |
| 2,162,512 | 6/1939 | McPherson | 62—244 XR |
| 2,977,774 | 4/1961 | Ferris | 62—507 XR |

MEYER PERLIN, *Primary Examiner.*

U.S. Cl. X.R.

62—244; 507